Oct. 27, 1936.   W. J. SMITH   2,058,920
POWER TAKE-OFF CONNECTIONS FOR WASHING MACHINES AND THE LIKE
Filed June 17, 1935   2 Sheets-Sheet 1
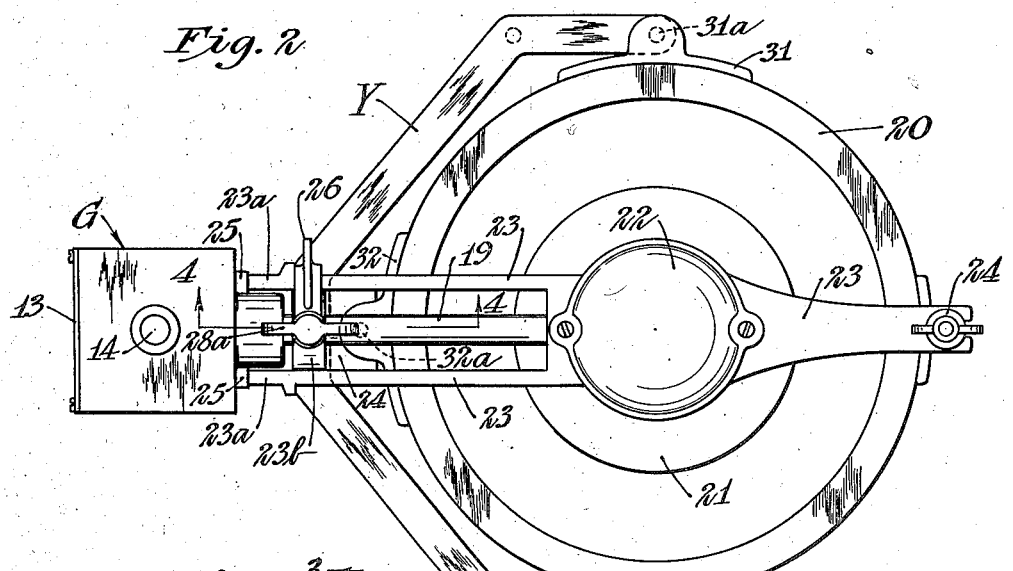
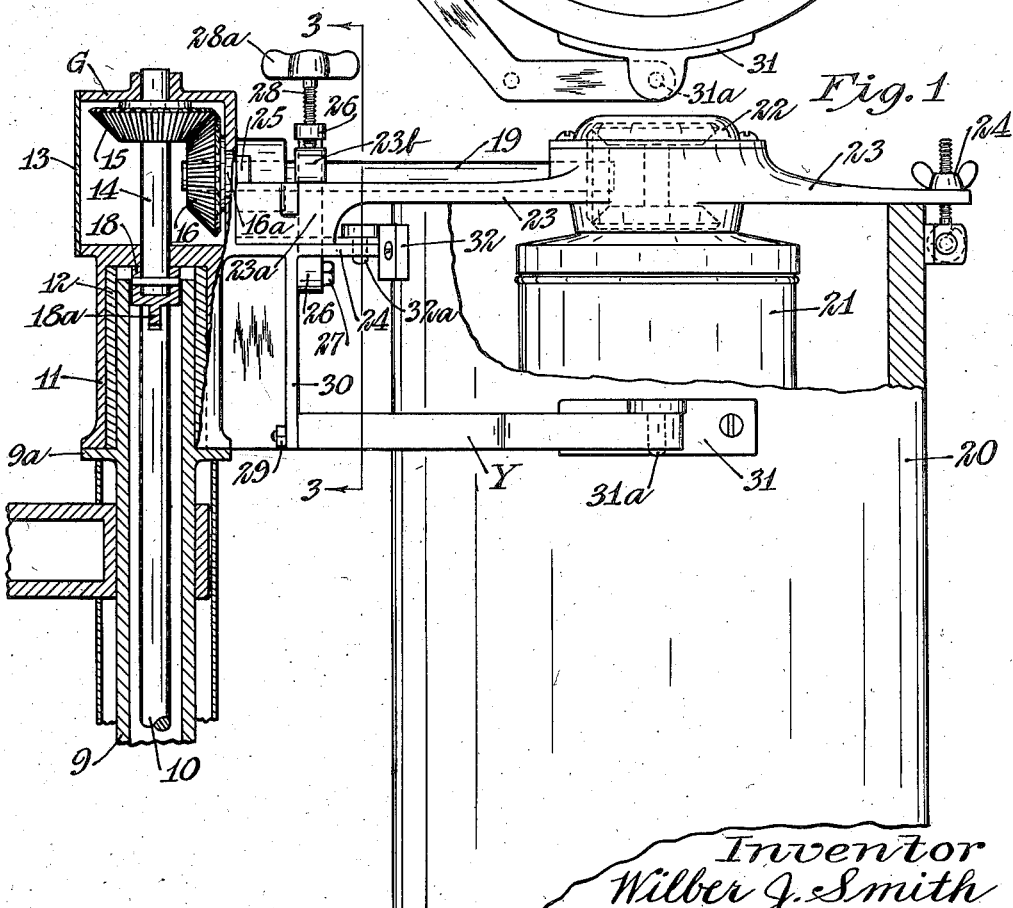
Inventor
Wilber J. Smith
By his Attorneys
Williamson & Williamson Oct. 27, 1936.     W. J. SMITH     2,058,920
POWER TAKE-OFF CONNECTIONS FOR WASHING MACHINES AND THE LIKE
Filed June 17, 1935     2 Sheets-Sheet 2
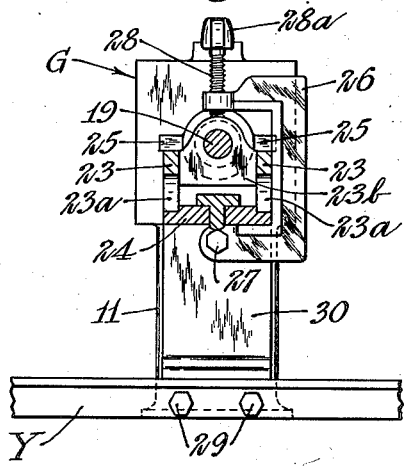
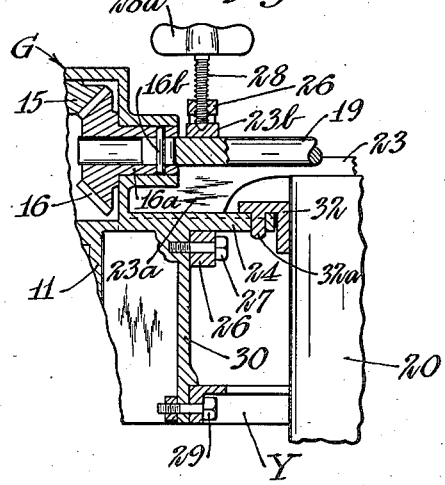
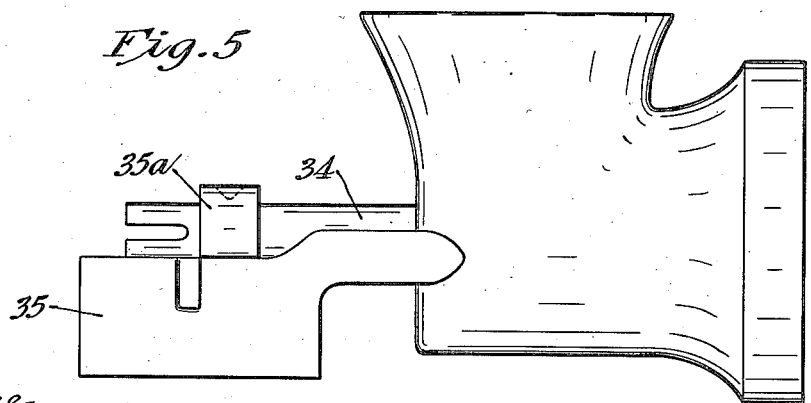
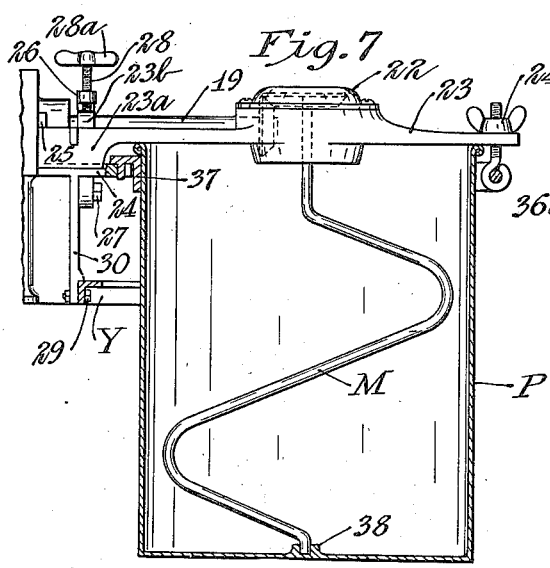
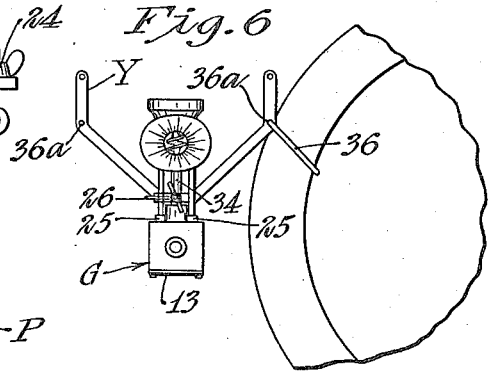
Inventor
Wilber J. Smith
By his Attorneys
Williamson & Williamson Patented Oct. 27, 1936

2,058,920

UNITED STATES PATENT OFFICE 2,058,920

POWER TAKE-OFF CONNECTIONS FOR WASHING MACHINES AND THE LIKE

Wilbur J. Smith, Owatonna, Minn.

Application June 17, 1935, Serial No. 26,960

6 Claims. (Cl. 74—11)

My invention relates to domestic attachments for use with washing machines and other devices which provide a source of power or power take off and more particularly relates to power take off connections and means for securing attachments to such machines for operation.

It is an object of my invention to provide simple and highly efficient means for securing a wide variety of attachments to a conventional device having a power take off shaft, such as a washing machine and further for coupling the attachments to the power mechanism for driving purposes.

Another object is the provision of power connections and attachment means of the class above referred to which make possible extremely simple and quick attachment or removal of various devices to or from the machine or other source of power, in a manner to adapt the machine to a wide variety of uses to which it has not hitherto been practical to apply the power from a washing machine or the like.

A still further object is the provision of simple and efficient coupling and attachment means for power driven devices capable of being uniformly applied to a wide variety of different household devices, such as ice cream freezers, meat grinders, food mixers, kraut cutters and the like, which require rotary power.

These and other objects and advantages of the invention will be more fully set forth in the following description made in connection with the accompanying drawings, in which like reference characters refer to similar parts throughout the several views, and in which:—

Fig. 1 is a view partly in side elevation with some parts broken away and others shown in vertical section, illustrating an embodiment of my invention applied to the wringer power shaft of a washing machine and an ice cream freezer attachment;

Fig. 2 is a top plan of the same;

Fig. 3 is a vertical section taken on the line 3—3 of Fig. 1;

Fig. 4 is a fragmentary vertical section taken on the line 4—4 of Fig. 2;

Fig. 5 is a side elevation showing a meat grinder attachment which embodies the connection and coupling means for cooperating with the other parts of my invention;

Fig. 6 is a plan view of said meat grinding attachment operatively connected with a washing machine, and Fig. 7 is a view partly in side elevation and partly in vertical section showing a food mixing attachment which may be utilized with a part of the ice cream freezer drive and which has my improved coupling means and connections applied thereto.

In the application of my invention disclosed in Figs. 1 to 4 inclusive, my power take off connections are shown as applied to an ice cream freezer to be operated from the power of the wringer shaft of a conventional type of washing machine. It will of course be understood that my invention is equally applicable to various power driven attachments and to attachments adapted for connection with other devices having a source of rotary power and a supporting structure as well as to washing machines.

In Figs. 1 and 2 the upstanding tubular wringer post 9 of a conventional type of washing machine is shown having mounted therein the vertical power shaft 10, which, in the form of washing machine illustrated, terminates a short distance below the upper connection end of wringer post 9. Post 9, it will be noted, has the conventional collar flange 9a disposed some distance below the upper connection end adapted to receive and support the skirt of a wringer attachment.

My improved mechanism includes a heavy frame or mounting for some of the working mechanism, which, as shown, is in the form of a gear case indicated as an entirety by the letter G, which has a depending skirt 11 surrounding the upper connection end of post 9. An adapter sleeve or bushing 12 is fitted into the skirt 11 of sufficient thickness to take up the space between said skirt and the upper end of wringer post 9 to form a tight joint between said parts. It will be obvious that with tubular wringer posts of smaller diameter than the one illustrated various sizes of adapter sleeves could be utilized to cause the skirt 11 of my gear case to properly fit the upper connection end of the post. Some types of washing machines equipped with power wringer attachments have relatively large tubular wringer posts and the skirt of the wringer attachment telescopes therein and is provided with a shoulder. In such instances an adapter or adapters of proper diameter for telescoping within the wringer post is utilized with the skirt 11 of my mechanism and the lower end of the skirt acts as a shoulder to engage the upper end of the wringer post with the adapter extended therebelow into the post. The upper portion of gear case 9 is of box-like form, open at one end and provided with a suitable rectangular cover 13. Revolubly mounted in gear case G and disposed in axial alignment with power shaft 10 is a stub shaft 14 having keyed to the upper portion thereof a beveled gear 15 which is meshed with beveled gear 16 which has an elongated hub 16a journaled in the outer side of the gear case. Suitable coupling means are provided for connecting stub shaft 14 with the upper end of power shaft 10 for driving. I prefer to employ an adapter 18 or a number of various sized adapters, if necessary, which, as shown, surrounds and is pinned to the lower end of stub shaft 14 and carries a driving lug 18a engaged with the slotted upper end of power shaft 10. For connection with other conventional types of power take off shafts, other shapes and styles of adapters can, of course, be utilized, all non-rotatively connected with the lower end of stub shaft 14. The hub 16a of the gear or driven element 16 as shown is adapted to receive the driving shaft 19 of the ice cream freezer attachment and is provided with a diametrically disposed driving pin 16b which engages the slotted outer end of attachment driving shaft 19.

The ice cream freezer illustrated is, for the most part, of conventional form including the cylindrical ice pail 20 in which is mounted the freezer can 21 having mounted therein a conventional type of dasher (not shown in detail) which is driven from a head 22 in conventional manner, said head being connected with a cross piece 23 one end of which is detachably clamped by a clamping device 24 to one side of the upper end of the pail.

I utilize a specially constructed cross piece which may be in the form of a casting and which has an over-hanging or projecting attachment portion 23a of heavy construction at its outer end and as shown being channeled in the portion connecting the heavier outer end with the head 22 for accommodation of the freezer driving shaft 19.

A rugged attachment bracket is rigidly connected with, or as shown, integrally formed with the outer side of gear case G and includes projecting shelf 24 disposed below the driven member or gear 16, upon which the lower surface of the head of connection portion 23a is adapted to rest. Some distance above shelf 24 I provide a pair of abutments 25 disposed on opposite sides of the bearing for beveled gear 16 and which are engaged by the upper surface of the connection portion 23a, the shelf and abutments supporting the connecting portion 23a, the head 22 and cross piece 23 in horizontal position. Associated with the said attachment bracket comprising parts 24 and 25 I utilize a clamping device best shown in Figs. 3 and 4. In the form illustrated a U-shaped jaw 26 is pivoted to the outer face of gear case G by a bolt or pin 27 and carries at its free end a clamping screw 28 threadedly engaging the bossed free end of jaw member 26 and having a winged handle 28a to facilitate turning thereof. It will readily be seen that the jaw member 26 may be swung from a position below the attachment portion 23a into the position shown in Figs. 3 and 4. Clamping screw 28 is adapted to bear against the recessed upper portion of a small yoke 23b which may be integrally formed with the projecting connection portion 23a of the freezer attachment.

To further support the pail of the freezer attachment and to prevent swinging of the pail relative to the attachment bracket mounted on gear case G I provide a yoke Y comprising a pair of arms rigidly secured by means such as bolts 29 to attachment rail 30 which is integrally formed with the gear case. These arms at their outer ends support the pail by underlying and engaging the flanges of brackets 31 secured to the pail. It will be further noted that said flanges carry depending dowels 31a which engage suitable apertured sockets formed in the ends of yoke Y. The upper portion of the pail is further supported by means of a bracket 32 similar to the bracket 31 which is fastened to the upper portion of the pail adjacent the shelf 24 and which carries a depending dowel 32a engaging a socket or aperture formed in shelf 24. The power wringer shaft of the washing machine partially illustrated turns in a clock-wise direction when viewed from the upper end of said shaft. Several standard types of washing machines have their wringer shafts connected for rotation in counter-clockwise direction and in such instances the beveled gear 15 on stub shaft 14 is removed, reversed and keyed to the stub shaft and meshes with the under portion of driven element or gear 16.

In operation the construction is strong, driving engagement is efficient and positive and the working parts will withstand long continued use. By utilizing adapters 18 of the different sizes and shapes and by reversing, when necessary, the position of the beveled gear 15, my construction adapts itself to connection with a large number of different devices having power take off shafts, including all detachable wringer-equipped power driven washing machines.

It is seen that driving connection between the attachment driving shaft 19 and the driven member 16 disposed in the gear case is always assured through the efficient means for rigidly securing the projecting connection portion 23a of the attachment with the attachment bracket of the gear case.

In Fig. 5 the same principles of connection and coupling for driving are shown embodied in a meat grinder attachment. The meat grinder driving shaft 34, as shown, is disposed longitudinally above the heavy overhanging or projecting connection portion 35 of the device, which connecting portion is precisely similar to the enlarged connecting portion 23a of the ice cream freezer attachment shown in Figs. 1 to 4 and which when the device is attached is interposed between the shelf 24 of the attachment bracket and the abutment lugs 25. The connection portion 35 carries a yoke 35a disposed above the meat grinder shaft 34 and similar in structure to the yoke 23b on the freezer attachment. Yoke 35a is recessed at its upper surface to receive the clamping screw 28. Compact attachments employing my invention, such as meat grinders, grinding wheels, fruit presses are entirely supported and secured to the attachment bracket of gear case G by the connection and clamping of the projecting connection portion 35 with the bracket. In the meat grinder (see Fig. 5) the outer end of the grinding shaft is slotted, as in the case of the freezer shaft, to straddle and engage the pin 16b disposed in the hub or socket portion of the driven gear 16. With such compact attachments I provide suitable means associated with the yoke Y to hold the attachments against swinging when driven. This is readily accomplished by the use of the U-shaped clip 36 (see Fig. 6), one leg of which is inserted through an aperture 36a formed in one of the arms of yoke Y, the other leg of which fits the inner side of the tub of the washing machine, the clip straddling the edge of the tub to prevent swinging of the attachment.

In Fig. 7 I show a food mixer attachment employing my invention in its connection and coupling with the powershaft of a washing machine wringer. In this attachment the head of the ice cream freezer attachment is utilized and is connected for attachment with the bracket or gear case G in the manner previously described and a special pail P is employed having supporting brackets similar to the brackets 31 of the ice cream freezer for engagement with the yoke Y and also having a bracket 37 similar to the bracket 32 of the freezer pail for attachment in the aperture formed in shelf 24.

The bottom of the pail is provided with a central boss 38 which is recessed to receive the lower and axial end of a substantially Z-shaped agitator or mixer M, the upper axial portion of which is fitted into the square socket of the freezer head 22.

With this food mixer attachment, adequate power is obtained and properly applied for efficiently mixing heavy batters, dough and other foods.

From the foregoing description it will be seen that the power take off connections and principal means for connection of various attachments may be uniform in conformance to my invention herein disclosed. It will further be seen that the invention is applicable to devices such as washing machines and the like having power take off shafts.

It will still further be seen that various attachments may be successfully utilized and may be very quickly attached or removed without the use of any tools and that such attachments are wholly supported from the power giving device, such as the washing machine, without requiring special pedestals, frames or other supporting structures and occupying a minimum amount of space.

It will, of course, be understood that various changes may be made in the form, details, arrangement and proportions of the parts, without departing from the scope of my invention, which, generally stated, consists in a device capable of carrying out the objects above set forth, and in the novel parts and combinations of parts disclosed and defined in the appended claims.

What is claimed is:—

1. In combination with a device having a vertical power shaft and a mounting for said shaft, and in combination with an attachment requiring rotary driving power; a frame supported on said mounting, a rotary driven element mounted in said frame with its axis disposed horizontally, driving connections between said driven element and said power shaft, said frame including a horizontal supporting shelf disposed adjacent said driven element, said attachment having a rigid connection portion projecting therefrom adapted for support upon said shelf, means for clamping said connection portion to said shelf to support said attachment, said attachment having a rotary driving shaft and coupling means between the end of said driving shaft and said driven element.

2. In combination with a device provided with a rigid vertical tubular member and a power shaft mounted within said tubular member and in combination with a device constituting an attachment requiring rotary driving power, a mounting supported by and having connection with the upper portion of said tubular member, a rotary driven element in said mounting having its axis disposed horizontally and having coupling means accessible from outside of said mounting, driving connections between said driven element and said power shaft, said mounting including a supporting and attachment bracket rigidly connected therewith adjacent said driven element, said attachment device including a rigid connecting portion projecting therefrom, means for rigidly securing said connecting portion to said attachment bracket for supporting said attachment device, a rotary driving shaft in said attachment device and means for drivably connecting said last mentioned shaft with the coupling means of said driven element.

3. In combination with a power shaft of a washing machine or the like and an attachment for use with such machine, a gear case detachably mounted on said washing machine and having a portion surrounding said power shaft, a rotary driven element mounted in said gear case and having its axis disposed at an angle to the axis of said power shaft, said driven element having coupling means accessible from outside of said gear case, detachable driving connections between said driven element and said power shaft, a supporting and attachment bracket rigidly connected with said gear case adjacent said driven element and comprising a horizontal shelf disposed below said element and projecting outwardly from said gear case and abutment means disposed some distance above said shelf and below said driven element, said attachment having an overhanging connection portion adapted to be received between said shelf and said abutment means for support thereby, means for securing said connection portion against outward displacement from said shelf, said attachment having a rotary driving shaft and coupling means between the end of said driving shaft and said driven element in said gear case.

4. In combination with a power shaft of a washing machine or the like and an attachment power take off connections and attachments comprising, a gear case, a portion of which is mounted about one end of said power take off shaft, a stub shaft, driving connections between one end of said stub shaft and said power take off shaft, a driving and a driven gear in said gear case, said driven gear having an axis extending at an angle to the axis of said power take off shaft, a stub shaft to which said driven gear is fixed, said shaft being journaled in said gear case, an attachment supporting bracket fixed to one side of said gear case and including a shelf and abutment means disposed some distance above said shelf, said attachment having a projecting connection portion adapted to snugly fit between said shelf and abutment means and said attachment also including a shaft disposed above said projecting portion and having detachable driving connection with the stub shaft of said driven gear and means associated with said bracket for securing the projecting connection portion of said attachment from displacement from said bracket.

5. In combination with a device provided with a rigid vertical tubular member and a power shaft mounted within said tubular member and in combination with a device constituting an attachment requiring rotary driving power, a mounting supported by and having connection with the upper portion of said tubular member, a rotary driven element in said mounting having its axis disposed horizontally and having coupling means accessible from outside of said mounting, driving connections between said driven element and said power shaft, said mounting including a supporting and attachment bracket rigidly connected therewith adjacent said driven element, said attachment device including a rigid connecting portion projecting therefrom, means for rigidly securing said connecting portion to said attachment bracket for supporting said attachment device, a rotary driving shaft in said attachment device, means for drivably connecting said last mentioned shaft with the coupling means of said driven element, said attachment device including a container and said bracket including rigidly connected means for removably supporting said container.

6. In combination with a device having a vertical power shaft and a mounting for said shaft, and in combination with an attachment requiring rotary driving power; a frame supported on said mounting, a rotary driven element mounted in said frame and connected for driving with said shaft, said driven element having shaft coupling means at its outer end accessible from outside of said frame, said frame including a supporting and attachment bracket rigidly connected with said mounting adjacent said driven element, said attachment including a rigid connecting portion projecting therefrom, means for rigidly securing said connecting portion to said attachment bracket for supporting said attachment device, a rotary driving shaft in said attachment device and means for drivably connecting said last mentioned shaft with said coupling means of said driven element.

WILBUR J. SMITH.